(12) United States Patent
Jia et al.

(10) Patent No.: US 10,862,331 B2
(45) Date of Patent: Dec. 8, 2020

(54) CHARGER CHARGING CIRCUIT, MOBILE TERMINAL CHARGING CIRCUIT, CHARGER AND MOBILE TERMINAL

(71) Applicant: VIVO MOBILE COMMUNICATION CO., LTD., Dongguan (CN)

(72) Inventors: Guangqi Jia, Dongguan (CN); Yanbin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 180 days.

(21) Appl. No.: 16/315,952

(22) PCT Filed: Jul. 12, 2017

(86) PCT No.: PCT/CN2017/092551
§ 371 (c)(1),
(2) Date: Jan. 7, 2019

(87) PCT Pub. No.: WO2018/036291
PCT Pub. Date: Mar. 1, 2018

(65) Prior Publication Data
US 2019/0148972 A1 May 16, 2019

(30) Foreign Application Priority Data
Aug. 22, 2016 (CN) .......................... 2016 1 0703744

(51) Int. Cl.
*H02J 7/00* (2006.01)
*H02J 7/04* (2006.01)
*H02J 7/02* (2016.01)

(52) U.S. Cl.
CPC ............ *H02J 7/045* (2013.01); *H02J 7/0027* (2013.01); *H02J 7/022* (2013.01); *H02J 7/04* (2013.01);
(Continued)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS 4,994,726 A * 2/1991 Tamura .................. A61H 33/60
320/107
2009/0155674 A1 * 6/2009 Ikeuchi ............... H01M 10/441
429/91
(Continued)

FOREIGN PATENT DOCUMENTS

CN 103475068 A 12/2013
CN 203813501 U 9/2014
(Continued)

OTHER PUBLICATIONS

Extended European Search Report, European Application No. 17842714. 2, dated Jan. 10, 2020.
(Continued)

*Primary Examiner* — Arun C Williams
(74) *Attorney, Agent, or Firm* — Marshall, Gerstein & Borun LLP

(57) ABSTRACT

The present disclosure provides a charger charging circuit, a mobile terminal charging circuit, a charger and a mobile terminal. The charger charging circuit includes: a voltage conversion circuit configured to convert an alternating current into a direct current and be connected with an alternating current charging power supply; a first charging interface configured to be connected with a second charging interface of a mobile terminal, where the first charging interface includes a voltage output end coupled with the voltage conversion circuit and a plurality of first data transmission ends; and a first control circuit. An end of the first control circuit is coupled with the voltage conversion circuit; and
(Continued)

another end of the first control circuit is coupled with at least one of the first data transmission ends.

17 Claims, 2 Drawing Sheets

(52) U.S. Cl.
CPC ............. *H02J 7/00* (2013.01); *H02J 2207/20* (2020.01); *H02J 2207/30* (2020.01)

(56) References Cited

U.S. PATENT DOCUMENTS

| | | | |
|---|---|---|---|
| 2009/0184688 A1 | 7/2009 | Kim et al. | |
| 2012/0249087 A1* | 10/2012 | Kimura | H02J 7/0031 320/164 |
| 2014/0365695 A1 | 12/2014 | Peng et al. | |
| 2015/0002079 A1 | 1/2015 | Jeong et al. | |
| 2015/0207353 A1* | 7/2015 | Oku | H02J 7/0029 320/107 |
| 2015/0303724 A1 | 10/2015 | Lin et al. | |
| 2016/0352130 A1 | 12/2016 | Zhang et al. | |
| 2019/0245387 A1* | 8/2019 | Park | H02J 7/025 |

FOREIGN PATENT DOCUMENTS

| | | |
|---|---|---|
| CN | 104239240 A | 12/2014 |
| CN | 105426332 A | 3/2016 |
| CN | 205193796 | 4/2016 |
| CN | 105703436 A | 6/2016 |
| CN | 205489730 U | 8/2016 |
| CN | 106230083 A | 12/2016 |
| EP | 2315335 A2 | 4/2011 |
| EP | 2854253 A1 | 4/2015 |
| EP | 3101754 A1 | 12/2016 |
| WO | WO-2015113336 A1 | 8/2015 |

OTHER PUBLICATIONS

Written Opinion of the International Searching Authority for International Application No. PCT/CN2017/092551, dated Sep. 27, 2017.

Chinese Search Report, Chinese Patent Application No. 201610703744.9, dated Jun. 26, 2017.

International Search Report for International application No. PCT/CN2017/092551, dated Sep. 27, 2017.

* cited by examiner

CHARGER CHARGING CIRCUIT, MOBILE TERMINAL CHARGING CIRCUIT, CHARGER AND MOBILE TERMINAL

CROSS-REFERENCE TO RELATED APPLICATION

This application is the U.S. national phase of PCT Application No. PCT/CN2017/092551 filed on Jul. 12, 2017, which claims the benefit and priority of Chinese Application No. 201610703744.9, filed on Aug. 22, 2016. The entire disclosures of the application are incorporated herein by reference.

TECHNICAL FIELD

The present disclosure relates to the field of smart mobile terminals, and in particular to a charger charging circuit, a mobile terminal charging circuit, a charger and a mobile terminal.

BACKGROUND

With development and popularization of smart mobile terminals, users have higher requirements for the mobile terminals. In addition to requiring the mobile terminals to have rich usage functions, the mobile terminals are required to achieve fast charging and sufficient endurance capability. By increasing the speed of charging and shortening the user's charging waiting time, the user's experience can be significantly improved. Currently, when a standard USB socket and a standard USB cable are used, the maximum current that can be transmitted during charging is limited by the USB protocol. For example, the maximum transmission current supported by the type-C interface is 5 A. When larger current is needed to be charged, the limitation of Vbus over-current capacity becomes a bottleneck.

SUMMARY

Embodiments of the present disclosure provide a charger charging circuit, a mobile terminal charging circuit, a charger and a mobile terminal, which can solve the problems of poor over-current capability of standard USB sockets and cables in the related art.

According to a first aspect, one embodiment of the present disclosure provides a charger charging circuit applied in a charger. The charger charging circuit includes: a voltage conversion circuit configured to convert an alternating current into a direct current and be connected with an alternating current charging power supply; a first charging interface configured to be connected with a second charging interface of a mobile terminal; wherein the first charging interface includes a voltage output end coupled with the voltage conversion circuit and a plurality of first data transmission ends; a first control circuit; wherein an end of the first control circuit is coupled with the voltage conversion circuit; and another end of the first control circuit is coupled with at least one of the first data transmission ends. The charger charging circuit has a first control state and a second control state. At the first control state, the voltage conversion circuit is connected with the first data transmission ends, and current output by the voltage conversion circuit flows through the voltage output end and each conductive path in which the first data transmission ends are. At the second control state, the voltage conversion circuit is disconnected with the first data transmission ends, and the current output by the voltage conversion circuit flows through only each conductive path in which the voltage output end is.

According to a second aspect, one embodiment of the present disclosure further provides a charger including the above charger charging circuit.

According to a third aspect, one embodiment of the present disclosure further provides a mobile terminal charging circuit applied in a mobile terminal that is capable of being connected with the above charger. The mobile terminal charging circuit includes: a second charging interface configured to be coupled with the first charging interface of the charger, wherein the second charging interface includes a voltage input end and a plurality of second data transmission ends; a charging control circuit coupled with the voltage input terminal; a second control circuit, wherein an end of the second control circuit is coupled with the charging control circuit; another end of the second control circuit is coupled with at least one of the second data transmission ends. The mobile terminal charging circuit has a third control state and a fourth control state. When the charger charging circuit is at the first control state, the mobile terminal charging circuit is at the third control state, the second data transmission ends are connected with the charging control circuit, and current flowing through the second data transmission ends and the voltage input end flows into the charging control circuit. When the charger charging circuit is at the second control state, the mobile terminal charging circuit is at the fourth control state, the second data transmission ends are disconnected with the charging control circuit, and current flowing through only the voltage input end flows into the charging control circuit.

According to a fourth aspect, one embodiment of the present disclosure further provides a mobile terminal that includes the above mobile terminal charging circuit.

Beneficial effects of the embodiments of the present disclosure are as follows: by setting the first control circuit between the voltage conversion circuit and the data transmission ends, when not requiring for quick charging, the first control circuit may control the voltage conversion circuit to be disconnected with the data transmission ends, so that the current output by the voltage conversion circuit flows through only the conductive path in which the voltage output end is while each of the data transmission ends can transmit data normally; when requiring for quick charging, the first control circuit may control the voltage conversion circuit to be connected with the data transmission ends, and the current output by the voltage conversion circuit flows through the voltage output end and each conductive path in which the data transmission ends are. In this way, each conductive path in which the data transmission end is, can also be used for charging without changing the existing cable standard, thereby increasing the total charging current and then realizing quick charging.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

Figure 1:
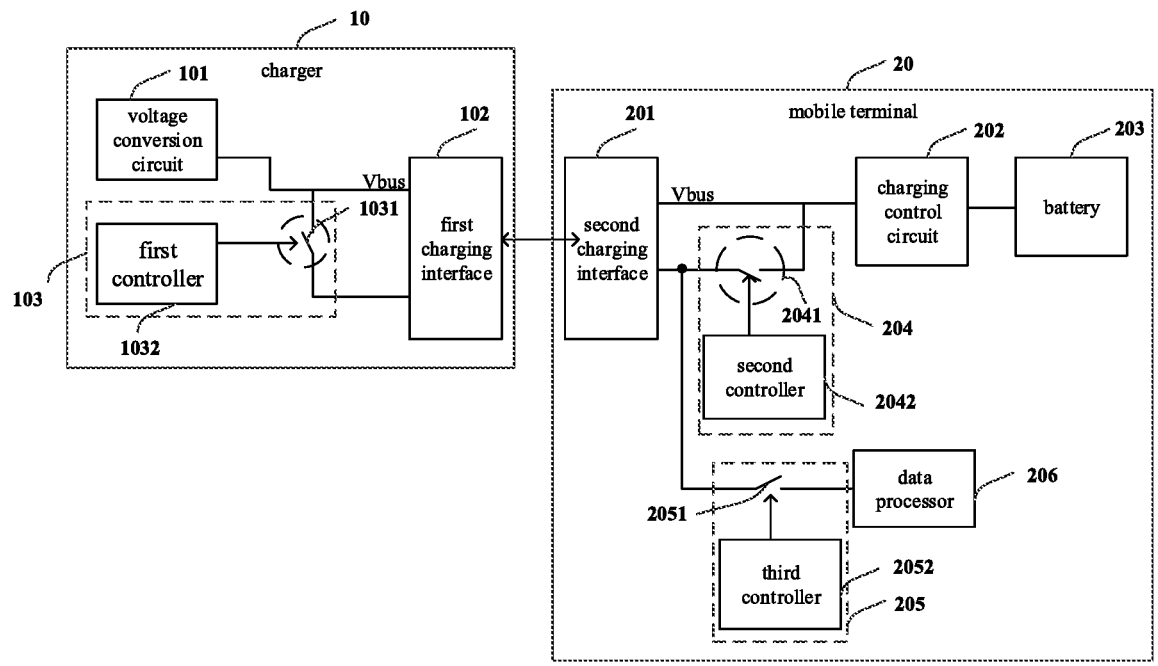
FIG. 1 is a schematic circuit diagram of a charging circuit according to the present disclosure.

Reference numbers in the drawings are listed below.

| | |
|---|---|
| 10 charger | |
| 101 voltage conversion circuit | 102 first charging interface |
| 103 first control circuit | 1031 first switching circuit |
| 1032 first controller | |
| 20 mobile terminal | |
| 201 second charging interface | 202 charging control circuit |
| 203 battery | 204 second control circuit |
| 205 third control circuit | 206 data processor |
| 2041 second switching circuit | 2042 second controller |
| 2051 third switching circuit | 2052 third controller |

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Figure 2:
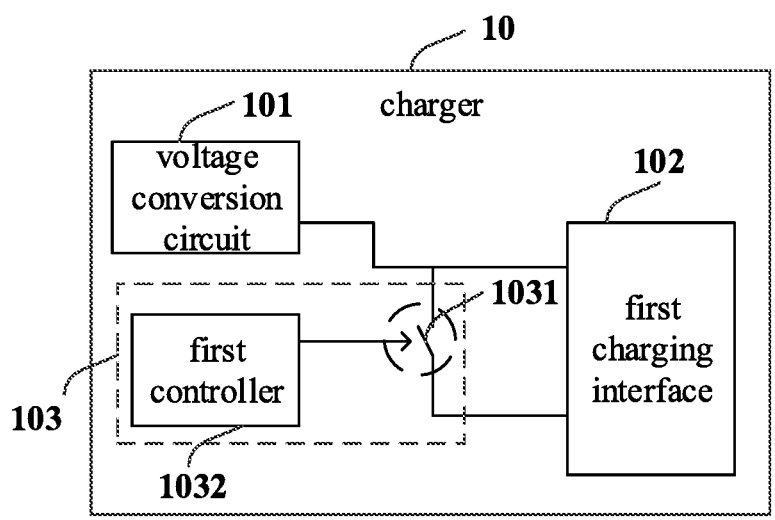
FIG. 2 is a schematic circuit diagram of a charger charging circuit according to some embodiments of the present disclosure.

In some embodiments of the present disclosure, as shown in FIG. 1 and FIG. 2, a charger charging circuit is provided and may be applied in a charger 10. The charger 10 specifically includes a voltage conversion circuit 101, a first charging interface 102 and a first control circuit 103.

The voltage conversion circuit 101 is connected with an alternating current (AC) charging power supply, and is mainly used to convert an alternating current output by the alternating current charging power supply into a direct current (DC). Specifically, the voltage conversion circuit 101 may be an AC-DC converter, i.e., AC-DC circuit.

The first charging interface 102 is configured to be connected with a second charging interface 201 of a mobile terminal. The first charging interface 102 includes a plurality of terminals or pins, and specifically includes a voltage output end coupled with the voltage conversion circuit 101 and a plurality of first data transmission ends for transmitting data. The first charging interface 102 is generally a USB interface; the voltage output end of the first charging interface 102 is a voltage pin of the USB interface, i.e., VBUS pin; and the first data transmission ends of the first charging interface 102 include data pins of the USB interface, i.e., D+ pin and D− pin.

One end of the first control circuit 103 is coupled with the voltage conversion circuit 101. Another end of the first control circuit 103 is coupled with at least one of the first data transmission ends of the first charging interface 102. In other words, an input end of the first control circuit 103 is coupled with the voltage conversion circuit 101, and an output end of the first control circuit 103 is coupled with at least one of the first data transmission ends. It should be noted that the output end of the first control circuit 103 may be coupled with one terminal, several terminals or all terminals of the first data transmission ends, and the specific number is not limited.

Further, the charger charging circuit of one embodiment of the present disclosure has a first control state and a second control state. At the first control state, the voltage conversion circuit 101 is connected with the selected first data transmission end, and then the current output by the voltage conversion circuit 101 flows through the voltage output end and each conductive path in which the selected first data transmission end is. At this point, the current that flows through the voltage output end and the selected first data transmission end, is used for charging. In other words, the selected first data transmission end is reused as a voltage output end, thereby increasing the total charging current and then realizing quick charging. At the second control state, the voltage conversion circuit 101 is disconnected with the selected first data transmission end, and then the current output by the voltage conversion circuit 101 flows through only the conductive path in which the voltage output end is. At this point, the charging current is only the current that flows through the voltage output end, and is limited by the current of charging cables in the existing standard, thus only normal charging is carried out.

Optionally, the first control circuit 103 includes a first switching circuit 1031 and a first controller 1032 that controls the first switching circuit 1031 to be turned on or off. A first end of the first switching circuit 1031 is coupled with the voltage conversion circuit 101, and a second end of the first switching circuit 1031 is coupled with at least one of the first data transmission ends. The first controller 1032 is coupled with a control end of the first switching circuit 1031. When the first controller 1032 receives a quick charging signal transmitted from the mobile terminal, the first controller 1032 controls the first switching circuit 1031 to be turned on, thereby enabling the voltage conversion circuit 101 to be connected with the first data transmission end. In other words, when the mobile terminal needs to be charged quickly, the mobile terminal triggers a quick charging instruction. When the first controller 1032 receives the quick charging instruction, the first controller 1032 outputs a control signal to control the first switching circuit 1031 to be turned on, thereby enabling the voltage conversion circuit 101 to be connected with the first data transmission end. At this point, the current that flows through the voltage output end and the selected first data transmission end, is used for charging. In other words, the selected first data transmission end is reused as a voltage output end, thereby increasing the total charging current and then realizing quick charging. The quick charging signal may be triggered after completion of handshake, power detection and other logic operations of charging devices.

Further, the first switching circuit 1031 may adopt a logic device to function as a switch. Specifically, a control end of the logic device is coupled with the first controller 1032; an input end of the logic device is coupled with the voltage conversion circuit 101; and an output end of the logic device is coupled with at least one of the first data transmission ends of the first charging interface 102. When the logic device is turned on, the voltage conversion circuit 101 is connected with the first data transmission end; and when the logic device is turned off, the voltage conversion circuit 101 is disconnected with the first data transmission end.

Figure 4:
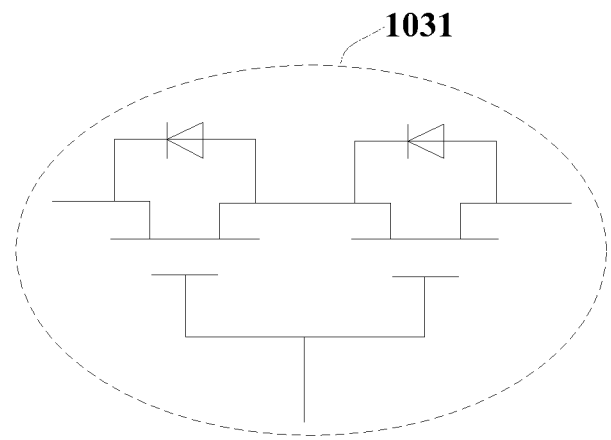
FIG. 4 is a schematic circuit diagram of a logic device of a charging circuit according to the present disclosure.

Specifically, as shown in FIG. 4, the logic device may be implemented as a field effect transistor. In order to completely isolate mutual intrusion between the voltage output end and the first data transmission end during charging and data transmission, the logic device may be constructed with two field effect transistors. The two field effect transistors may be P-type MOS transistors or N-type MOS transistors.

In order to reduce loss of the conductive path, N-type MOS transistors with a lower on-resistance may be preferably used. Specifically, the logic device includes a first field effect transistor and a second field effect transistor. A gate electrode of the first field effect transistor is connected in parallel with a gate electrode of the second field effect transistor, and then the gate electrode of the first field effect transistor and the gate electrode of the second field effect transistor are coupled with the first controller 1032. A source electrode of the first field effect transistor is coupled with the voltage conversion circuit 101. A drain electrode of the first field effect transistor is coupled with a drain electrode of the second field effect transistor. A source electrode of the second field effect transistor is coupled with at least one of the first data transmission ends of the first charging interface 102. When the first controller 1032 receives the quick charging signal, the first controller 1032 outputs a first signal to control the first field effect transistor and the second field effect transistor to be turned on, thereby enabling the voltage conversion circuit 101 to be connected with the first data transmission end. In the normal charging scenario, both of the first field effect transistor and the second field effect transistor are turned off, then charging and data transmission do not affect each other, thereby preventing occurrence of intrusion.

According to another aspect of one embodiment of the present disclosure, a charger 10 is provided. The charger 10 includes the above charger charging circuit.

In the charger and the charger charging circuit of the embodiments of the present disclosure, by setting the first control circuit 103 between the voltage conversion circuit 101 and the data transmission ends, when not requiring for quick charging, the first control circuit 103 may control the voltage conversion circuit 101 to be disconnected with the data transmission ends, so that the current output by the voltage conversion circuit 101 flows through only the conductive path in which the voltage output end is while each of the data transmission ends can transmit data normally; when requiring for quick charging, the first control circuit 103 may control the voltage conversion circuit 101 to be connected with the data transmission ends, and the current output by the voltage conversion circuit 101 flows through the voltage output end and each conductive path in which the data transmission ends are. In this way, each conductive path in which the data transmission ends are, can also be used for charging without changing the existing cable standard, thereby increasing the total charging current and then realizing quick charging.

Figure 3:
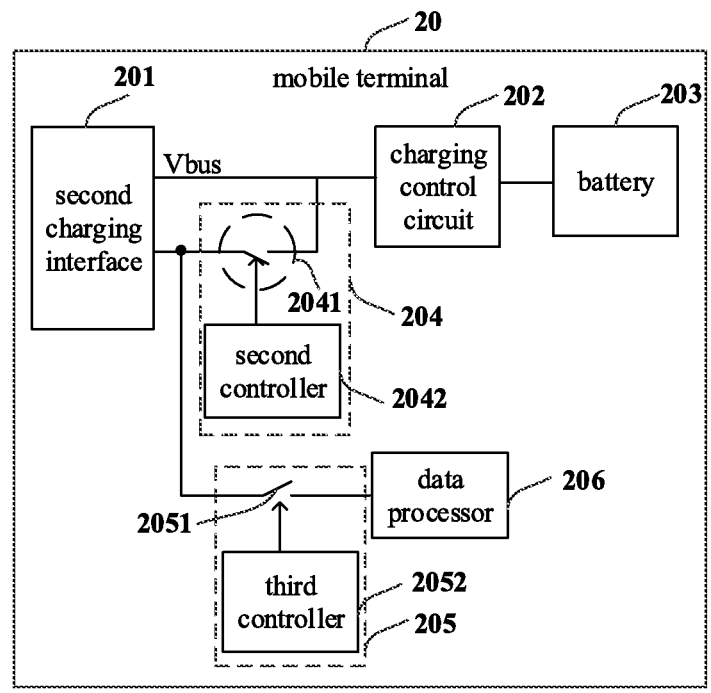
FIG. 3 is a schematic circuit diagram of a mobile terminal charging circuit according to some embodiments of the present disclosure.

In some embodiments of the present disclosure, as shown in FIG. 1 and FIG. 3, a mobile terminal charging circuit is provided and includes a second charging interface 201 that is coupled with the first charging interface 102 of the charger 10, a charging control circuit 202 and a second control circuit 204.

The second charging interface 201 includes a plurality of terminals or pins, and specifically includes a plurality of second data transmission ends for transmitting data and a voltage input end for charging. The second charging interface 201 may be a Micro USB interface or a USB Type-C interface. When the second charging interface 201 is the Micro USB interface, the voltage input end of the second charging interface 201 may be a voltage pin of the Micro USB interface, i.e., VBUS pin; and the second data transmission ends of the second charging interface 201 may include data pins of the Micro USB interface, i.e., D+ pin and D− pin. When the second charging interface 201 is the USB Type-C interface, the voltage input end of the second charging interface 201 may be a voltage pin of the USB Type-C interface, i.e., VBUS pin; and the second data transmission ends of the second charging interface 201 may include data pins of the USB Type-C interface, i.e., D+ pin, D− pin, Tx-pin, Rx-pin, SBU-pin and CC-pin.

The charging control circuit 202 is configured to charge a battery of the mobile terminal 20 and be coupled with the voltage input terminal.

An end of the second control circuit 204 is coupled with the charging control circuit 202. Another end of the second control circuit 204 is coupled with at least one of the second data transmission ends. In other words, an input end of the second control circuit 204 is coupled with at least one of the second data transmission ends, and an output end of the second control circuit 204 is coupled with the charging control circuit 202. It should be noted that the input end of the second control circuit 204 may be coupled with one terminal, several terminals or all terminals of the second data transmission ends, and the specific number is not limited.

Further, the mobile terminal charging circuit of one embodiment of the present disclosure has a third control state and a fourth control state. When the charger charging circuit is at the first control state, the mobile terminal charging circuit is at the third control state. Then, the second data transmission end is connected with the charging control circuit 202, and thus current flowing through the second data transmission end and the voltage input end flows into the charging control circuit 202. At this point, the current flowing through the selected second data transmission end and the voltage input end is used for charging. In other words, the selected second data transmission end is reused as a voltage input end, thereby increasing the total charging current and then realizing quick charging. When the charger charging circuit is at the second control state, the mobile terminal charging circuit is at the fourth control state. Then, the second data transmission end is disconnected with the charging control circuit 202, current flowing through only the voltage input end flows into the charging control circuit 202. At this point, the charging current is only the current that flows through the voltage input end, and is limited by the current of charging cables in the existing standard, thus only normal charging is carried out while the second data transmission ends are used for transmitting data.

Optionally, the second control circuit 204 includes a second switching circuit 2041 and a second controller 2042 that controls the second switching circuit 2041 to be turned on or off. A first end of the second switching circuit 2041 is coupled with at least one of the second data transmission ends of the second charging interface 201; a second end of the second switching circuit 2041 is coupled with the charging control circuit 202. The second controller 2042 is coupled with a control end of the second switching circuit 2041. When the second controller 2042 receives a quick charging signal, the second controller 2042 controls the second switching circuit 2041 to be turned on, thereby enabling the second data transmission end to be connected with the charging control circuit 202. In other words, when the mobile terminal 20 needs to be charged quickly, the mobile terminal triggers a quick charging instruction. When the second controller 2042 receives the quick charging instruction, the second controller 2042 outputs a control signal to control the second switching circuit 2041 to be turned on, thereby enabling the second data transmission end to be connected with the charging control circuit 202. At this point, the current that flows through the voltage input end and the selected second data transmission end, is used for charging. In other words, the selected second data transmission end is reused as a voltage input end, thereby increasing the total charging current and then realizing quick charging. The quick charging signal may be triggered after completion of handshake, power detection and other logic operations of charging devices.

Further, the second switching circuit 2041 may adopt a logic device to function as a switch. Specifically, a control end of the logic device is coupled with the second controller 2042; an input end of the logic device is coupled with at least one of the second data transmission ends of the second charging interface 201; and an output end of the logic device is coupled with the charging control circuit 202. When the logic device is turned on, the second data transmission end is connected with the charging control circuit 202; and when the logic device is turned off, the second data transmission end is disconnected with the charging control circuit 202.

Specifically, as shown in FIG. 4, the logic device may be implemented as a field effect transistor. In order to completely isolate mutual intrusion between the voltage input end and the second data transmission end during charging and data transmission, the logic device may be constructed with two field effect transistors. The two field effect transistors may be P-type MOS transistors or N-type MOS transistors. In order to reduce loss of the conductive path, N-type MOS transistors with a lower on-resistance may be preferably used. Specifically, the logic device includes a third field effect transistor and a fourth field effect transistor. A gate electrode of the third field effect transistor is connected in parallel with a gate electrode of the fourth field effect transistor, and then the gate electrode of the third field effect transistor and the gate electrode of the fourth field effect transistor are coupled with the second controller 2042. A source electrode of the third field effect transistor is coupled with at least one of the second data transmission ends of the second charging interface 201. A drain electrode of the third field effect transistor is coupled with a drain electrode of the fourth field effect transistor. A source electrode of the fourth field effect transistor is coupled with the charging control circuit 202. When the second controller 2042 receives the quick charging signal, the second controller 2042 outputs a second signal to control the third field effect transistor and the fourth field effect transistor to be turned on, thereby enabling the second data transmission end to be connected with the charging control circuit 202. In the normal charging scenario, both of the third field effect transistor and the fourth field effect transistor are turned off, then charging and data transmission do not affect each other, thereby preventing occurrence of intrusion.

Further, in order to prevent occurrence of adverse effects between charging and data transmission, the charging circuit further includes a third control circuit 205. An end of the third control circuit 205 is coupled with a data processor 206 of the mobile terminal 20. Another end of the third control circuit 205 is coupled with the second data transmission ends of the second charging interface 201. In other words, an input end of the third control circuit 205 is coupled with at least one of the second data transmission ends of the second charging interface 201. The input end of the third control circuit 205 may be coupled with one terminal, several terminals or all terminals of the second data transmission ends, the specific number is not limited and these terminals are reused as terminals for charging. An output end of the third control circuit 205 is coupled with the data processor 206 of the mobile terminal 20. Specifically, when the charging circuit is at the third control state, the data processor 206 is disconnected from the second data transmission ends, and the data transmission cannot be carried out; when the charging circuit is at the fourth control state, the data processor 206 is connected with the second data transmission ends, and the data transmission can be carried out normally.

Optionally, the third control circuit 205 includes a third switching circuit 2051 and a third controller 2052 that controls the third switching circuit 2051 to be turned on or off. A first end of the third switching circuit 2051 is coupled with the second data transmission ends of the second charging interface 201. A second end of the third switching circuit 2051 is coupled with the data processor 206. A control end of the third switching circuit 2051 is coupled with the third controller 2052. When the third controller 2052 receives a quick charging signal transmitted from the charging control circuit, the third controller 2052 controls the third switching circuit 2051 to be turned off, thereby enabling the second data transmission ends of the second charging interface 201 to be disconnected from the data processor 206, thereby preventing occurrence of adverse effects between charging and data transmission.

Further, the third switching circuit 2051 may adopt a logic device to function as a switch. Specifically, a control end of the logic device is coupled with the third controller 2052; an input end of the logic device is coupled with the second data transmission ends of the second charging interface 201; and an output end of the logic device is coupled with the data processor 206. When the logic device is turned on, the second data transmission ends of the second charging interface 201 are connected with the data processor 206 and can transmit data normally; when the logic device is turned off, the second data transmission ends of the second charging interface 201 are disconnected with the data processor 206 and then cannot transmit data.

Specifically, as shown in FIG. 4, the logic device may be implemented as a field effect transistor. In order to completely isolate mutual intrusion between the voltage input end and the second data transmission end during charging and data transmission, the logic device may be constructed with two field effect transistors. Specifically, the logic device includes a fifth field effect transistor and a sixth field effect transistor. A gate electrode of the fifth field effect transistor is connected in parallel with a gate electrode of the sixth field effect transistor, and then the gate electrode of the fifth field effect transistor and the gate electrode of the sixth field effect transistor are coupled with the third controller 2052. A source electrode of the fifth field effect transistor is coupled with the second data transmission ends of the second charging interface 201. A drain electrode of the fifth field effect transistor is coupled with a drain electrode of the sixth field effect transistor. A source electrode of the sixth field effect transistor is coupled with the data processor 206. When the third controller 2052 receives the quick charging signal, the third controller 2052 outputs a third signal to control the fifth field effect transistor and the sixth field effect transistor to be turned off, thereby enabling the second data transmission ends of the second charging interface 201 to be disconnected with the mobile terminal charging circuit.

In the mobile terminal charging circuit and the mobile terminal of the embodiments of the present disclosure, by setting the first control circuit between the voltage conversion circuit and the data transmission ends, when not requiring for quick charging, the first control circuit may control the voltage conversion circuit to be disconnected with the data transmission ends, so that the current output by the voltage conversion circuit flows through only the conductive path in which the voltage output end is while each of the data transmission ends can transmit data normally; when requiring for quick charging, the first control circuit may control the voltage conversion circuit to be connected with the data transmission ends, and the data transmission ends of the second charging interface are connected with the charging control circuit, and the current output by the voltage conversion circuit flows through the voltage output end and each conductive path in which the data transmission ends are. In this way, each conductive path in which the data transmission ends are, can also be used for charging without changing the existing cable standard, thereby increasing the total charging current and then realizing quick charging.

The various embodiments in the present disclosure are described in a progressive manner, and each embodiment focuses on differences from other embodiments, and the same similar parts between the various embodiments may be referred to each other.

Although optional embodiments of the present disclosure have been described, those of ordinary skill in the art may make further changes and modifications of the embodiments. Therefore, the appended claims are intended to be interpreted as including the embodiments and the modifications.

Finally, it should also be noted that the relationship terminologies such as "first", "second" and the like are only used herein to distinguish one entity or operation from another, rather than necessitate or imply that the actual relationship or order exists between the entities or operations. Furthermore, terms of "include", "comprise" or any other variants are intended to be non-exclusive. Therefore, a process, method, article or device including a plurality of components includes not only the listed components but also other components that are not enumerated, or, also include the components inherent for the process, method, article or device. Without other limitations, the component defined by the statement "comprising (including) one . . . " does not exclude the case that other similar components may exist in the process, method, article or device having the above component.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A charger charging circuit applied in a charger, comprising:
    a voltage conversion circuit configured to convert an alternating current into a direct current and be connected with an alternating current charging power supply;
    a first charging interface configured to be connected with a second charging interface of a mobile terminal; wherein the first charging interface includes a voltage output end coupled with the voltage conversion circuit and a plurality of first data transmission ends;
    a first control circuit; wherein an end of the first control circuit is coupled with the voltage conversion circuit; and another end of the first control circuit is coupled with at least one of the first data transmission ends;
    wherein the charger charging circuit has a first control state and a second control state;
    at the first control state, the voltage conversion circuit is connected with the at least one of the first data transmission ends, and current output by the voltage conversion circuit flows through the voltage output end and each conductive path in which the at least one of the first data transmission ends is; at the second control state, the voltage conversion circuit is disconnected with the at least one of the first data transmission ends, and the current output by the voltage conversion circuit flows through only each conductive path in which the voltage output end is.

2. The charger charging circuit of claim 1, wherein the first control circuit includes a first switching circuit and a first controller that controls the first switching circuit to be turned on or off;
    a first end of the first switching circuit is coupled with the voltage conversion circuit, and a second end of the first switching circuit is coupled with the at least one of the first data transmission ends;
    the first controller is coupled with a control end of the first switching circuit; when the first controller receives a quick charging signal transmitted from the mobile terminal, the first controller controls the first switching circuit to be turned on, thereby enabling the voltage conversion circuit to be connected with the at least one of the first data transmission ends.

3. The charger charging circuit of claim 2, wherein the first switching circuit includes a logic device; a control end of the logic device is coupled with the first controller; an input end of the logic device is coupled with the voltage conversion circuit;
    and an output end of the logic device is coupled with at least one of the first data transmission ends of the first charging interface;
    when the logic device is turned on, the voltage conversion circuit is connected with the at least one of the first data transmission ends; and when the logic device is turned off, the voltage conversion circuit is disconnected with the at least one of the first data transmission ends.

4. The charger charging circuit of claim 3, wherein the logic device includes a first field effect transistor and a second field effect transistor;
    a gate electrode of the first field effect transistor is connected in parallel with a gate electrode of the second field effect transistor, and the gate electrode of the first field effect transistor and the gate electrode of the second field effect transistor are coupled with the first controller;
    a source electrode of the first field effect transistor is coupled with the voltage conversion circuit;
    a drain electrode of the first field effect transistor is coupled with a drain electrode of the second field effect transistor;
    a source electrode of the second field effect transistor is coupled with at least one of the first data transmission ends of the first charging interface;
    when the first controller receives the quick charging signal, the first controller outputs a first signal to control the first field effect transistor and the second field effect transistor to be turned on, thereby enabling the voltage conversion circuit to be connected with the at least one of the first data transmission ends.

5. The charger charging circuit of claim 1, wherein the first charging interface is a USB interface; the voltage output end of the first charging interface is a voltage pin VBUS of the USB interface; and the first data transmission ends of the first charging interface include data pins including D+ pin and D− pin of the USB interface.

6. A charger comprising the charger charging circuit of claim 1.

7. A mobile terminal charging circuit applied in a mobile terminal that is capable of being connected with the charger of claim 6, the mobile terminal charging circuit comprising:
- a second charging interface configured to be coupled with the first charging interface of the charger; wherein the second charging interface includes a voltage input end and a plurality of second data transmission ends;
- a charging control circuit coupled with the voltage input terminal;
- a second control circuit; wherein an end of the second control circuit is coupled with the charging control circuit; another end of the second control circuit is coupled with at least one of the second data transmission ends;
- wherein the mobile terminal charging circuit has a third control state and a fourth control state; when the charger charging circuit is at the first control state, the mobile terminal charging circuit is at the third control state, the at least one of the second data transmission ends is connected with the charging control circuit, and current flowing through the at least one of the second data transmission ends and the voltage input end flows into the charging control circuit; when the charger charging circuit is at the second control state, the mobile terminal charging circuit is at the fourth control state, the at least one of the second data transmission ends are disconnected with the charging control circuit, and current flowing through only the voltage input end flows into the charging control circuit.

8. The mobile terminal charging circuit of claim 7, wherein the second control circuit includes a second switching circuit and a second controller that controls the second switching circuit to be turned on or off;
- a first end of the second switching circuit is coupled with the at least one of the second data transmission ends of the second charging interface; a second end of the second switching circuit is coupled with the charging control circuit;
- the second controller is coupled with a control end of the second switching circuit;
- when the second controller receives a quick charging signal transmitted from the charging control circuit, the second controller controls the second switching circuit to be turned on, thereby enabling the at least one of the second data transmission ends to be connected with the charging control circuit.

9. The mobile terminal charging circuit of claim 8, wherein the second switching circuit includes a logic device; a control end of the logic device is coupled with the second controller; an input end of the logic device is coupled with the at least one of the second data transmission ends of the second charging interface; and an output end of the logic device is coupled with the charging control circuit;
- when the logic device is turned on, the at least one of the second data transmission ends is connected with the charging control circuit; and when the logic device is turned off, the second data transmission ends are disconnected with the charging control circuit.

10. The mobile terminal charging circuit of claim 9, wherein the logic device includes a third field effect transistor and a fourth field effect transistor;
- a gate electrode of the third field effect transistor is connected in parallel with a gate electrode of the fourth field effect transistor, and the gate electrode of the third field effect transistor and the gate electrode of the fourth field effect transistor are coupled with the second controller;
- a source electrode of the third field effect transistor is coupled with at least one of the second data transmission ends of the second charging interface;
- a drain electrode of the third field effect transistor is coupled with a drain electrode of the fourth field effect transistor;
- a source electrode of the fourth field effect transistor is coupled with the charging control circuit;
- when the second controller receives the quick charging signal, the second controller outputs a second signal to control the third field effect transistor and the fourth field effect transistor to be turned on, thereby enabling the at least one of the second data transmission ends to be connected with the charging control circuit.

11. The mobile terminal charging circuit of claim 7, further comprising a third control circuit;
- wherein an end of the third control circuit is coupled with a data processor of the mobile terminal; another end of the third control circuit is coupled with the at least one of the second data transmission ends of the second charging interface;
- when the mobile terminal charging circuit is at the third control state, the data processor is disconnected from the second data transmission ends; when the mobile terminal charging circuit is at the fourth control state, the data processor is connected with the at least one of the second data transmission ends.

12. The mobile terminal charging circuit of claim 11, wherein the third control circuit includes a third switching circuit and a third controller;
- a first end of the third switching circuit is coupled with the at least one of the second data transmission ends of the second charging interface; a second end of the third switching circuit is coupled with the data processor; a control end of the third switching circuit is coupled with the third controller;
- when the third controller receives a quick charging signal transmitted from the charging control circuit, the third controller controls the third switching circuit to be turned off, thereby enabling the at least one of the second data transmission ends of the second charging interface to be disconnected from the data processor.

13. The mobile terminal charging circuit of claim 12, wherein the third switching circuit includes a logic device; a control end of the logic device is coupled with the third controller; an input end of the logic device is coupled with the at least one of the second data transmission ends of the second charging interface; and an output end of the logic device is coupled with the data processor;
- when the logic device is turned on, the at least one of the second data transmission ends of the second charging interface is connected with the data processor; when the logic device is turned off, the second data transmission ends of the second charging interface are disconnected with the data processor.

14. The mobile terminal charging circuit of claim 13, wherein the logic device includes a fifth field effect transistor and a sixth field effect transistor;
- a gate electrode of the fifth field effect transistor is connected in parallel with a gate electrode of the sixth field effect transistor, and the gate electrode of the fifth field effect transistor and the gate electrode of the sixth field effect transistor are coupled with the third controller;
- a source electrode of the fifth field effect transistor is coupled with the second data transmission ends of the second charging interface;

a drain electrode of the fifth field effect transistor is coupled with a drain electrode of the sixth field effect transistor;

a source electrode of the sixth field effect transistor is coupled with the data processor;

when the third controller receives the quick charging signal, the third controller outputs a third signal to control the fifth field effect transistor and the sixth field effect transistor to be turned off, thereby enabling the at least one of the second data transmission ends of the second charging interface to be disconnected with the data processor.

15. The mobile terminal charging circuit of claim 7, wherein the second charging interface is a Micro USB interface, the voltage input end of the second charging interface is a voltage pin VBUS of the Micro USB interface; and the second data transmission ends of the second charging interface include data pins including D+ pin and D– pin of the Micro USB interface.

16. The mobile terminal charging circuit of claim 7, wherein the second charging interface is a USB Type-C interface, the voltage input end of the second charging interface is a voltage pin VBUS of the USB Type-C interface; and the second data transmission ends of the second charging interface include data pins including D+ pin, D– pin, Tx-pin, Rx-pin, SBU-pin and CC-pin of the USB Type-C interface.

17. A mobile terminal comprising the mobile terminal charging circuit of claim 7.

* * * * *